United States Patent
Ryu et al.

(10) Patent No.: US 9,451,536 B2
(45) Date of Patent: Sep. 20, 2016

(54) UE INITIATED DISCOVERY IN ASSISTED MILLIMETER WAVELENGTH WIRELESS ACCESS NETWORKS

(71) Applicant: QUALCOMM Incorporated, San Diego, CA (US)

(72) Inventors: Jung Ho Ryu, Somerville, NJ (US); Sundar Subramanian, Bridgewater, NJ (US); Junyi Li, Chester, NJ (US); Ashwin Sampath, Skillman, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 137 days.

(21) Appl. No.: 14/308,389

(22) Filed: Jun. 18, 2014

(65) Prior Publication Data

US 2015/0373627 A1    Dec. 24, 2015

(51) Int. Cl.
  *H04W 4/00* (2009.01)
  *H04W 48/16* (2009.01)
  *H04W 16/28* (2009.01)
  *H04B 7/08* (2006.01)
  *H04W 72/04* (2009.01)
  *H04W 4/06* (2009.01)

(52) U.S. Cl.
  CPC .......... *H04W 48/16* (2013.01); *H04B 7/0802* (2013.01); *H04W 4/06* (2013.01); *H04W 16/28* (2013.01); *H04W 72/046* (2013.01)

(58) Field of Classification Search
  CPC ............................. H04W 48/16; H04W 16/28
  USPC ........................................ 455/434, 13.3, 524
  See application file for complete search history.

(56) References Cited

U.S. PATENT DOCUMENTS

| 5,649,287 A * | 7/1997 | Forssen | H01Q 3/26 342/367 |
| 8,200,286 B2 * | 6/2012 | Molnar | H01Q 1/246 455/562.1 |

(Continued)

FOREIGN PATENT DOCUMENTS

| EP | 2403286 A1 | 1/2012 |
| WO | 2013086410 A2 | 6/2013 |

OTHER PUBLICATIONS

International Search Report and Written Opinion—PCT/US2015/034546—ISA/EPO—Aug. 21, 2015.

(Continued)

*Primary Examiner* — Shahriar Behnamian
(74) *Attorney, Agent, or Firm* — Arent Fox LLP

(57) ABSTRACT

A method, an apparatus, and a computer program product for wireless communication are provided. The apparatus may be a UE. The UE transmits a beamformed broadcast request signal to a base station in a plurality of transmissions in transmit spatial directions of the UE, receives a beamformed broadcast response signal from the base station in a resource of a plurality of resources, and determines a preferred transmit spatial direction of the UE based on the resource in which the beamformed broadcast response signal is received. The apparatus may be a base station. The base station scans for a beamformed broadcast request signal from a UE, determines a preferred transmit spatial direction of transmit spatial directions of the UE, determines a resource of a plurality of resources for indicating the determined preferred transmit spatial direction, and transmits a beamformed broadcast response signal to the UE in the determined resource.

40 Claims, 15 Drawing Sheets

(56) References Cited

U.S. PATENT DOCUMENTS

| | | | |
|---|---|---|---|
| 2009/0232023 A1* | 9/2009 | Soffer | H01Q 3/26 370/254 |
| 2011/0205969 A1* | 8/2011 | Ahmad | H04W 16/28 370/328 |
| 2011/0243040 A1 | 10/2011 | Khan et al. | |
| 2012/0155443 A1 | 6/2012 | Cordeiro | |
| 2013/0059544 A1 | 3/2013 | Chen et al. | |
| 2013/0065622 A1* | 3/2013 | Hwang | H04W 16/28 455/500 |
| 2013/0156120 A1 | 6/2013 | Josiam et al. | |
| 2013/0237218 A1 | 9/2013 | Li et al. | |
| 2013/0301454 A1 | 11/2013 | Seol et al. | |
| 2015/0195015 A1* | 7/2015 | Kim | H04B 7/043 370/252 |
| 2015/0215077 A1* | 7/2015 | Ratasuk | H04B 7/0623 455/436 |
| 2015/0289147 A1* | 10/2015 | Lou | H04B 7/0408 370/329 |

OTHER PUBLICATIONS

Rappaport T.S., et al., "Millimeter Wave Mobile Communications for 5G Cellular: It Will Work," Access, IEEE, 2013, vol. 1, pp. 335-349.

* cited by examiner

UE INITIATED DISCOVERY IN ASSISTED MILLIMETER WAVELENGTH WIRELESS ACCESS NETWORKS

BACKGROUND

1. Field

The present disclosure relates generally to communication systems, and more particularly, to user equipment (UE) initiated discovery in assisted millimeter wavelength wireless access networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology, which operates at or near a 2 GHz carrier frequency. Preferably, these improvements should be applicable to other multi-access technologies and the telecommunication standards that employ these technologies.

One way to meet the increasing demand for mobile broadband is to utilize the millimeter wavelength spectrum in addition to LTE. However, communications using the millimeter wavelength radio frequency band has extremely high path loss and a short range. Beamforming may be used to compensate for the extreme high path loss and short range. Beamforming techniques and methods are needed for UE initiated discovery in LTE assisted millimeter wavelength wireless access networks.

SUMMARY

In an aspect of the disclosure, a method, a computer program product, and an apparatus are provided. The apparatus may be a UE. The UE transmits a beamformed broadcast request signal to a base station in a plurality of transmissions in a plurality of transmit spatial directions of the UE. The UE receives a beamformed broadcast response signal from the base station in a resource of a plurality of resources. The UE determines a preferred transmit spatial direction of the UE based on the resource in which the beamformed broadcast response signal is received.

In an aspect of the disclosure, a method, a computer program product, and an apparatus are provided. The apparatus may be a base station. The base station scans for a beamformed broadcast request signal from a UE. The beamformed broadcast request signal is associated with a plurality of transmissions from the UE. Each transmission is associated with a transmit spatial direction of a plurality of transmit spatial directions of the UE. The base station determines a preferred transmit spatial direction of the transmit spatial directions of the UE. The base station determines a resource of a plurality of resources for indicating the determined preferred transmit spatial direction. The base station transmits a beamformed broadcast response signal to the UE in the determined resource.

The apparatus may include a memory and at least one processor coupled to the memory. The at least one processor may be configured to perform the aforementioned steps of the UE or the base station. A computer program product stored on a computer-readable medium and comprising code that when executed on at least one processor may perform the aforementioned steps of the UE or the base station.

DETAILED DESCRIPTION

Figure 1:
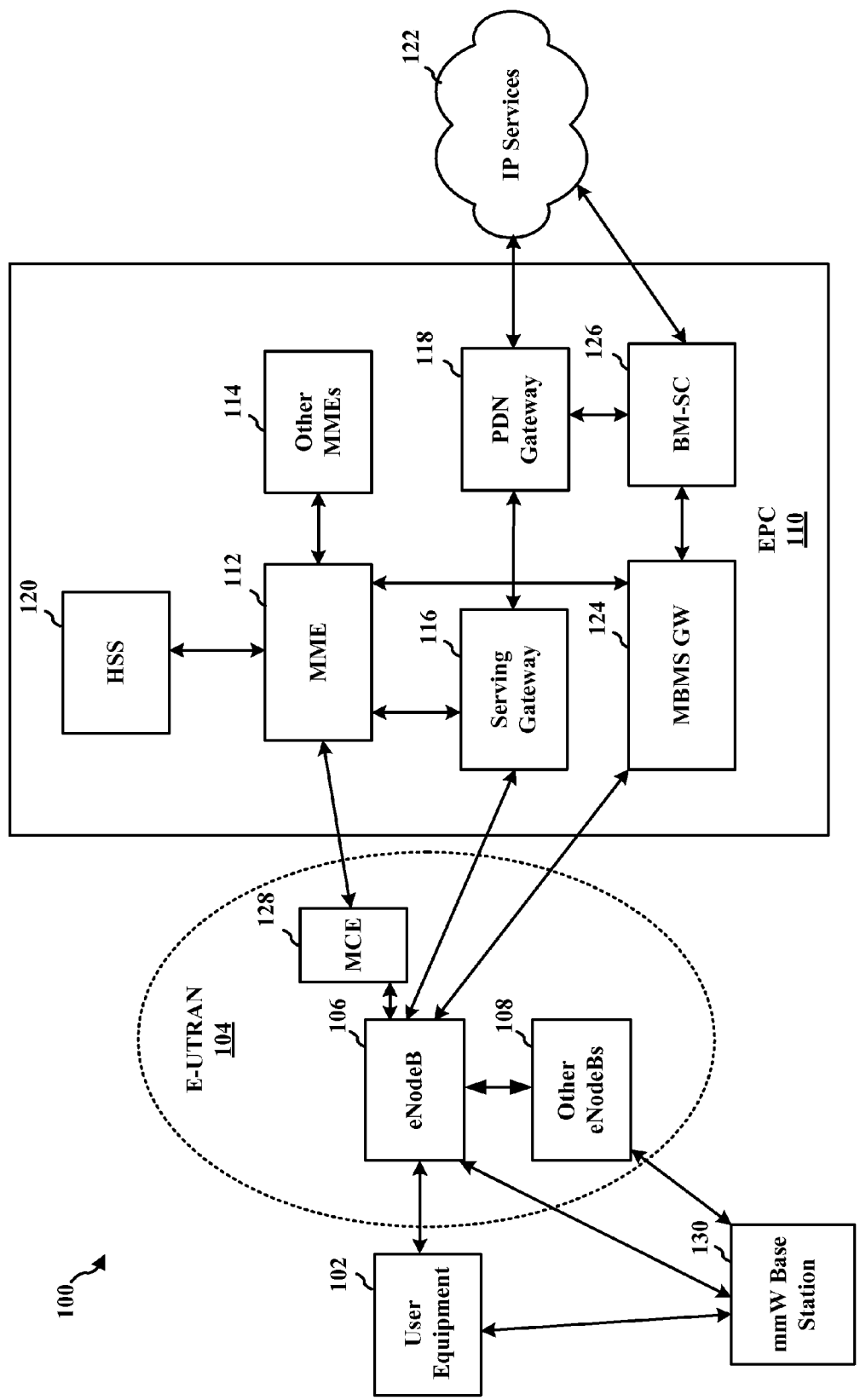
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a network architecture 100. The network architecture 100 includes an LTE network architecture including one or more user equipment (UE) 102, an Evolved UMTS Terrestrial Radio Access Network (E-UTRAN) 104, and an Evolved Packet Core (EPC) 110. The network architecture 100 further includes a millimeter wavelength (mmW) network that includes an mmW base station 130 and the one or more UE 102. The LTE network architecture may be referred to as an Evolved Packet System (EPS). The EPS may include one or more UE 102, the E-UTRAN 104, the EPC 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
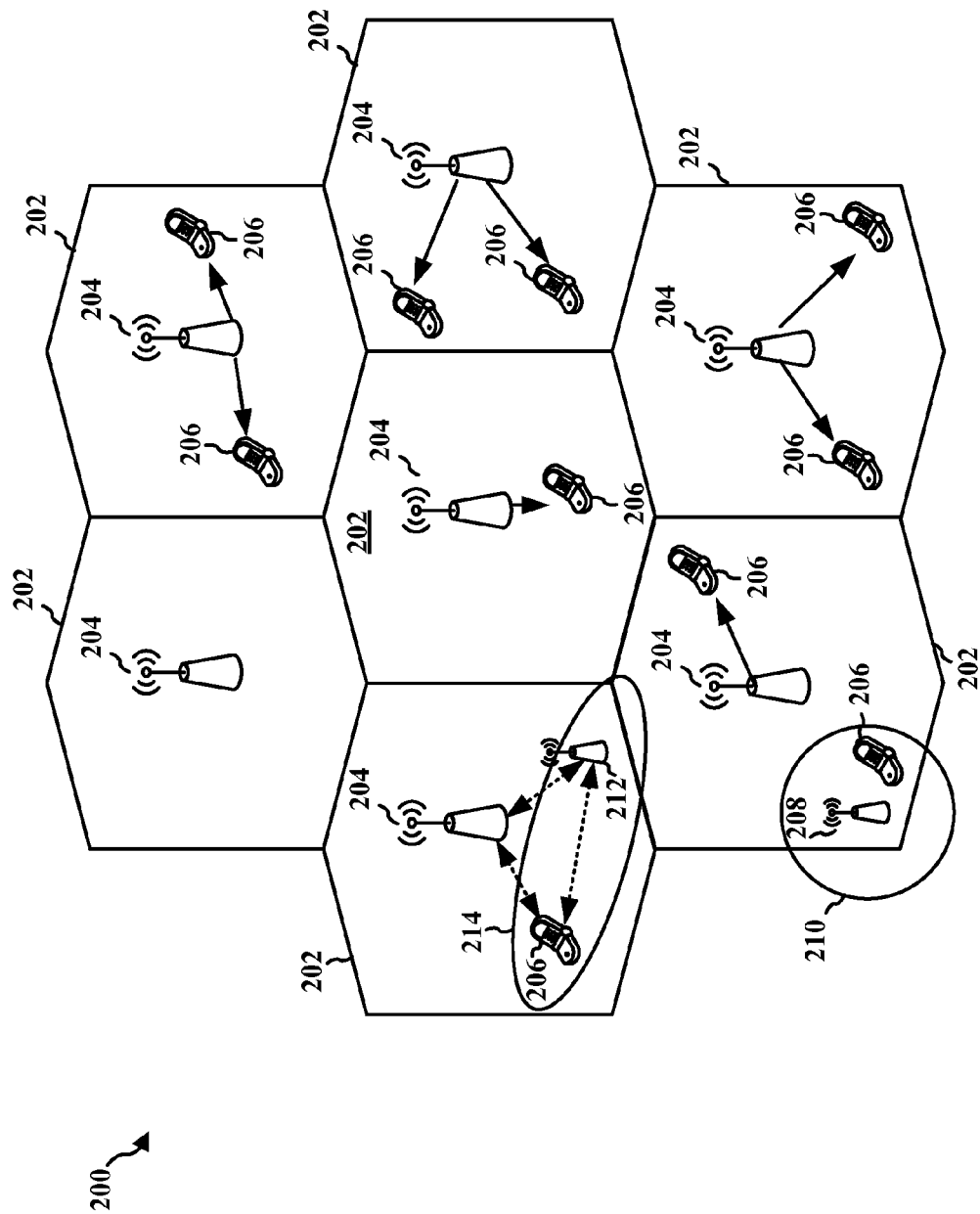
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). One or more mmW base stations 212 may have coverage regions 214 that overlap with one or more of the cells 202. The mmW base stations 212 may communicate with UEs 206 and macro eNBs 204. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
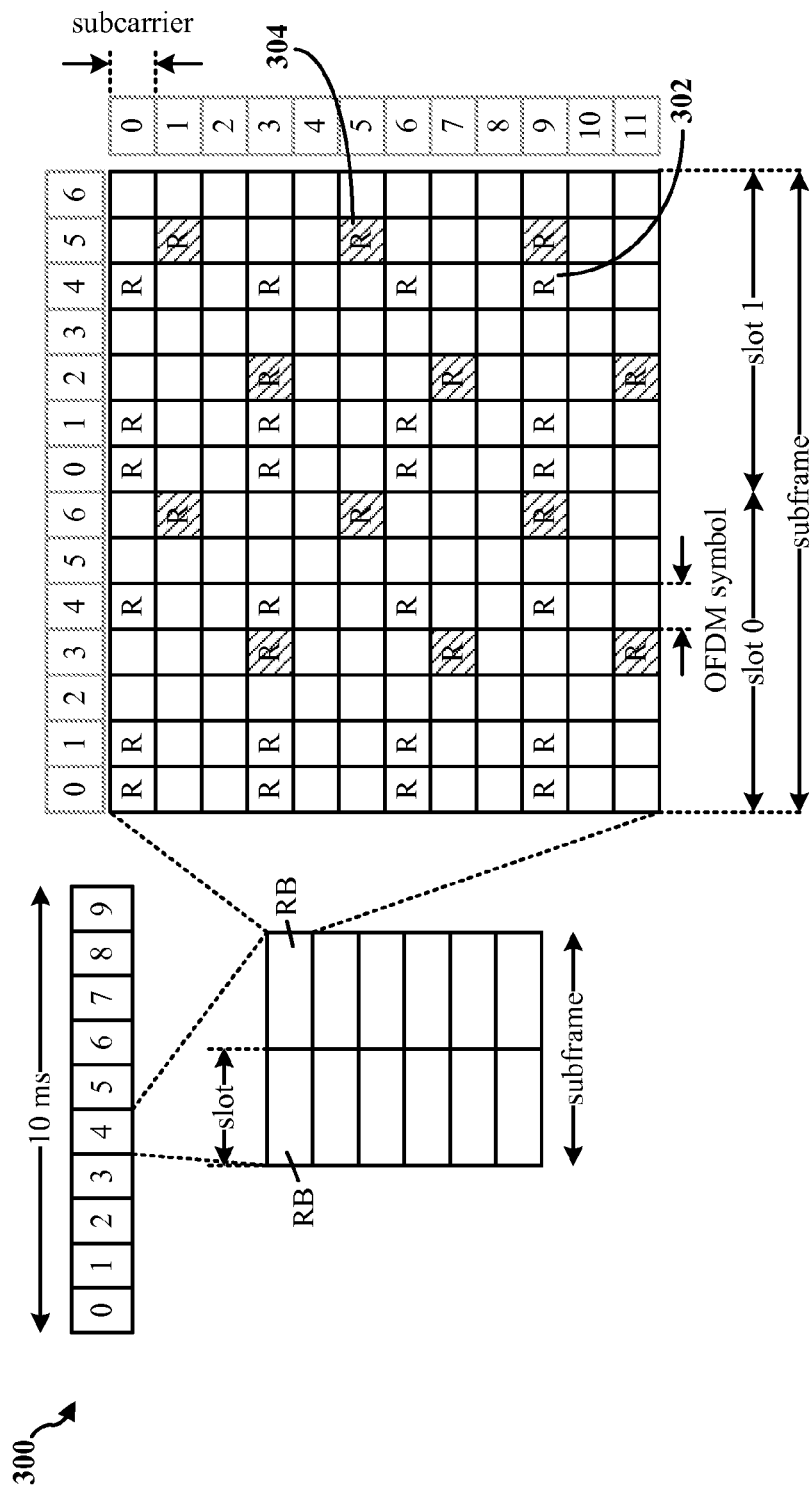
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
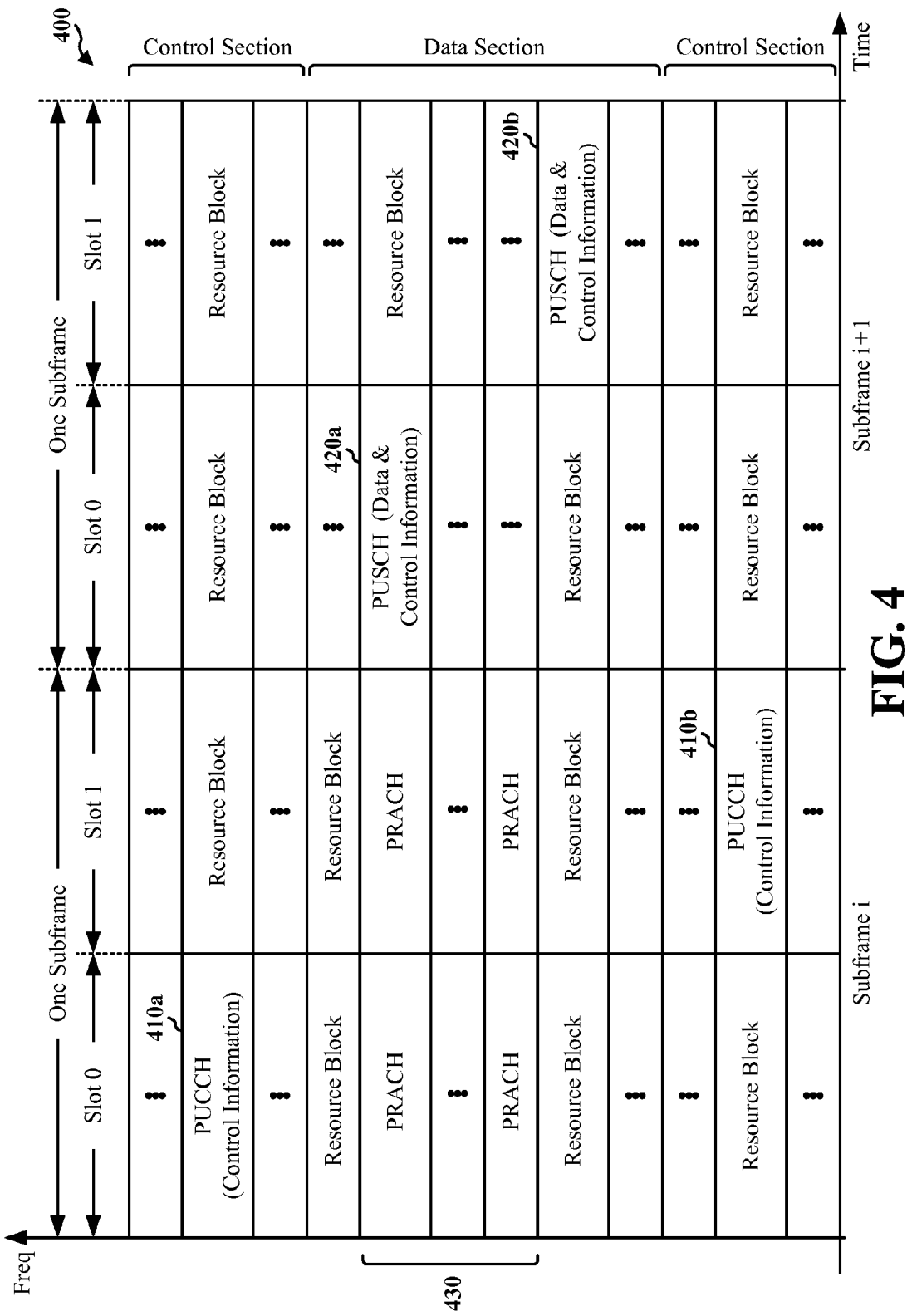
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
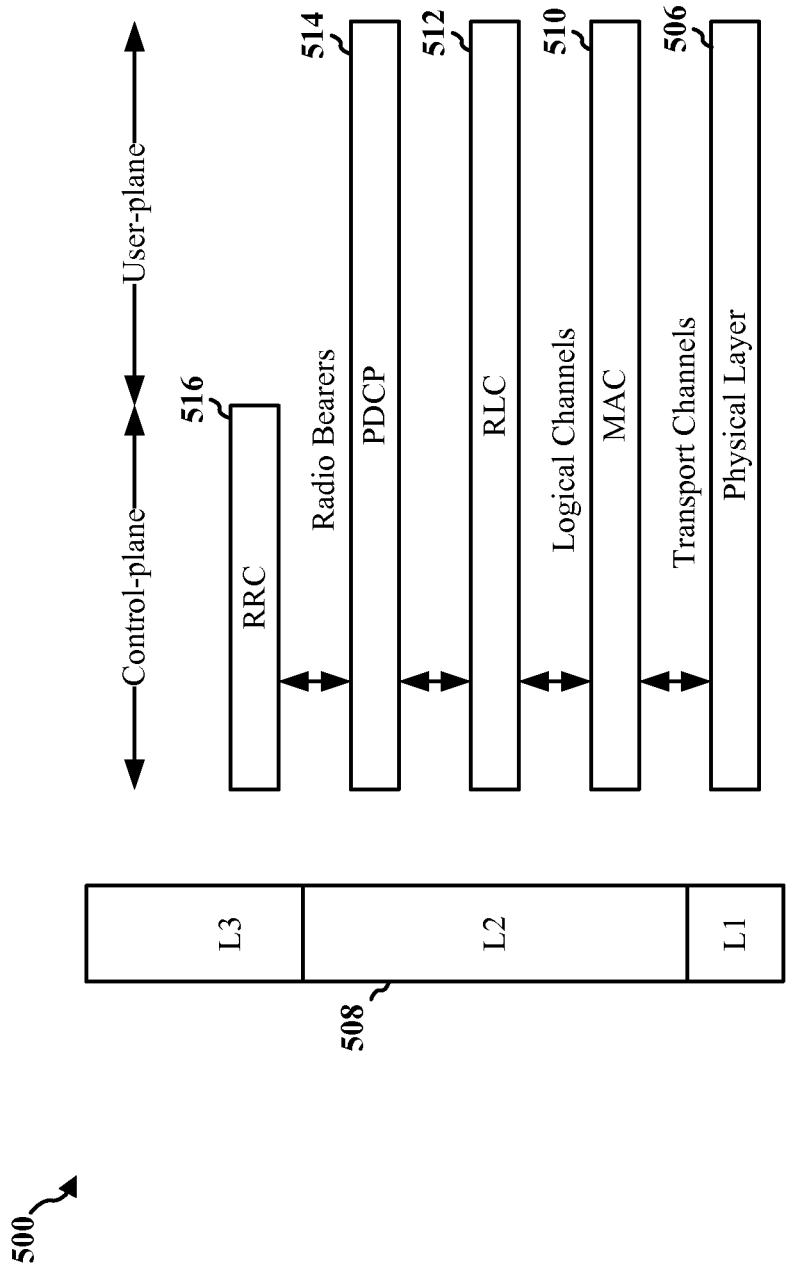
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
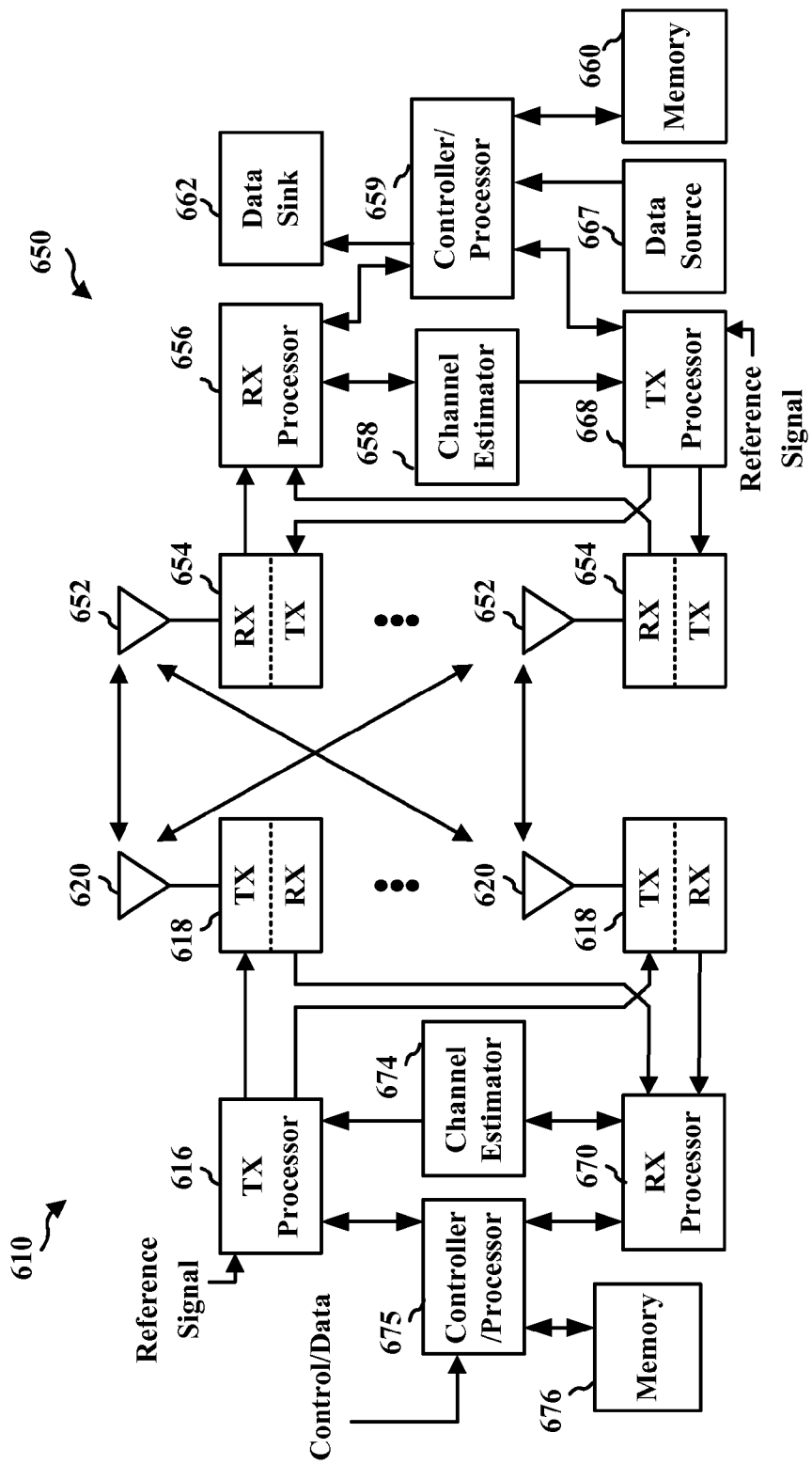
FIG. 6 is a diagram illustrating an example of an evolved Node B and user equipment in an access network.

FIG. 6 is a block diagram of a base station 610 in communication with a UE 650 in an access network. The base station 610 may be an eNB or an mmW base station. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer.

Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

If the base station 610 is an mmW base station, the base station 610 may include hardware for performing analog and/or digital beamforming. If the base station 610 is equipped with analog beamforming, at any one time, the base station 610 may transmit or receive a signal in only one direction. If the base station 610 is equipped with digital beamforming, the base station 610 may concurrently transmit multiple signals in multiple directions or may receive multiple signals concurrently in multiple directions. Further, the UE 650 may include hardware for performing analog and/or digital beamforming. If the UE 650 is equipped with analog beamforming, at any one time, the UE 650 may transmit or receive a signal in only one direction. If the UE 650 is equipped with digital beamforming, the UE 650 may concurrently transmit multiple signals in multiple directions or may concurrently receive multiple signals in multiple directions.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to mmW base stations, it should be understood that the disclosure also applies to near mmW base stations. The millimeter wavelength RF channel has extremely high path loss and a short range. In order to build a useful communication network in the millimeter wavelength spectrum, a beamforming technique may be used to compensate for the extreme high path loss. The beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. The beamforming technique requires that the mmW base stations and the UEs transmit and receive in a direction that allows the most RF energy to be collected. Accordingly, without knowing the directions for the beamforming, a reliable link between the UEs and the mmW base stations cannot be made. Without a reliable link, UEs cannot discover the millimeter wavelength access network. In particular, without a reliable link, network parameter initialization, secure handshaking processes between the network and the UEs, and network state tracking processes cannot be performed.

Beamforming techniques and methods are provided infra with respect to UE initiated discovery in assisted (e.g., LTE assisted) millimeter wavelength wireless access networks.

Figure 7:
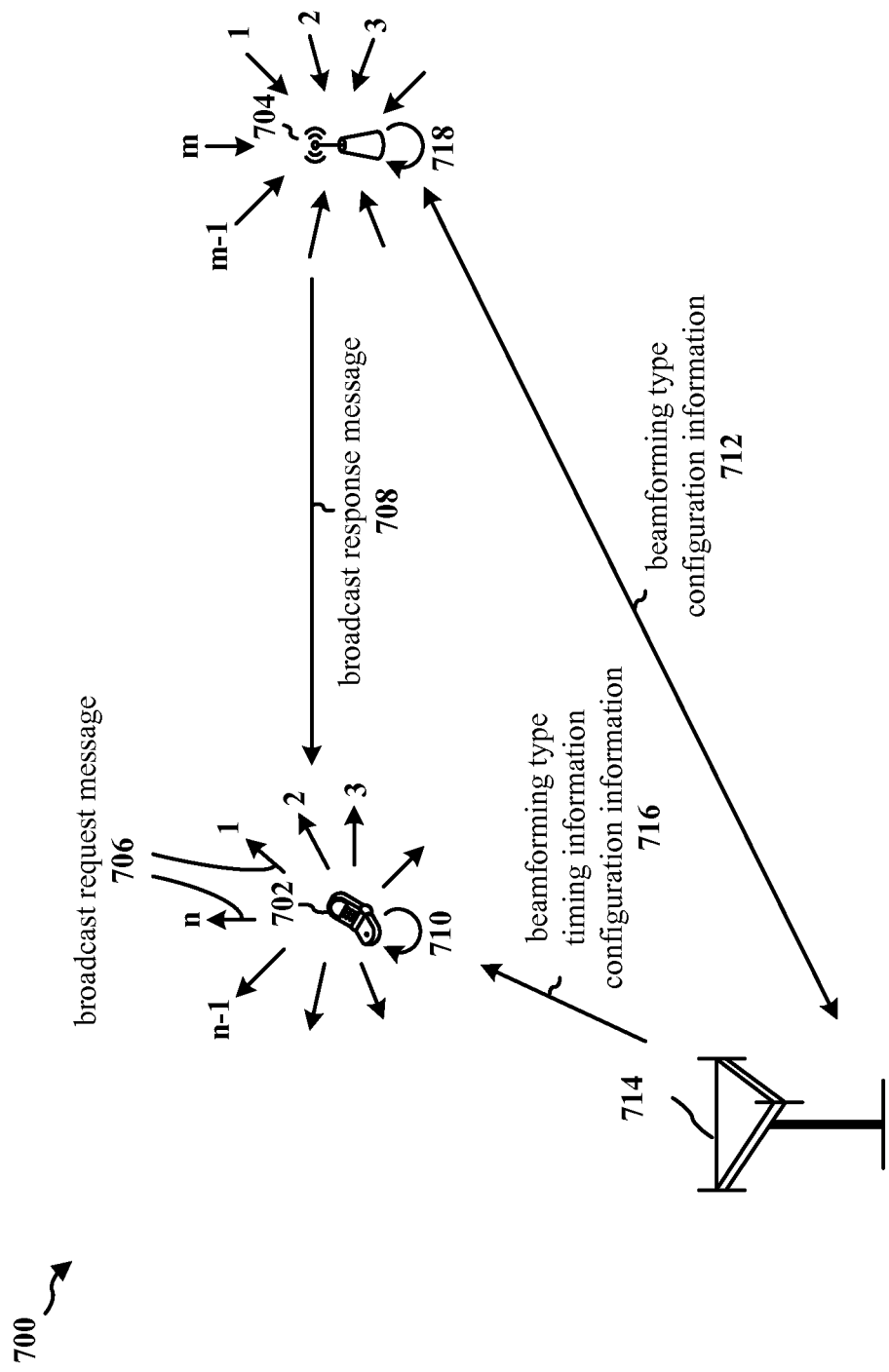
FIG. 7 is a first diagram for illustrating exemplary methods associated with UE initiated discovery in assisted millimeter wavelength wireless access networks.

FIG. 7 is a first diagram 700 for illustrating exemplary methods associated with UE initiated discovery in assisted millimeter wavelength wireless access networks. Referring to FIG. 7, when the UE 702 turns on, the UE 702 searches for a nearby LTE network. The UE 702 discovers the macro eNB 714, which belongs to an LTE network. The UE 702 synchronizes to the LTE network and camps on a cell associated with the eNB 714. The UE 702 acquires timing information from the eNB 714. The timing information may include a primary synchronization signal and a secondary synchronization signal. The UE 702 may also obtain configuration information associated with mmW base stations in the vicinity of the UE. The configuration information (also referred to herein as millimeter wavelength access network configuration information) may include positions of the mmW base stations, relative timings and/or timing offsets of the mmW base stations with respect to the LTE network timing, and/or configuration parameters (e.g., number of mmW base station receive/transmit spatial directions (also referred to as sectors), identifiers, or other configuration parameters) of the mmW base stations. The UE 702 may receive additional information from the eNB 714 for correcting its carrier frequency offset. The UE 702 may also obtain a beamforming type for one or more of the mmW base stations. The beamforming type may be analog or digital. The eNB 714 may receive 712 the beamforming type and configuration information associated with the mmW base station 704 from the mmW base station 704. The eNB 714 may transmit the received information with its timing information to the UE 702 in the signal 716. Accordingly, the signal 716 may include information indicating the beamforming type of the mmW base station 704. The beamforming type may indicate whether the mmW base station 704 is equipped to perform digital beamforming or analog beamforming. The signal 716 may further indicate additional details in association with digital beamforming capabilities at the mmW base station 704. The UE 702 may receive the beamforming type, the timing information, the configuration information, and/or additional information in the signal 716 from the eNB 714. Based on the received information in the signal 716, the UE 702 performs an initialization process with the mmW base station 704.

In the initialization process, the UE 702 transmits a beamformed broadcast request message/signal 706 in different spatial directions to nearby mmW base stations. The time periods in which the UE 702 transmits a beamformed broadcast request message 706 may be based on the timing information received from the eNB 714 through the LTE network, and may be further based on additional millimeter wavelength access network configuration information received from the eNB 714 in signal 716 through the LTE network. The UE 702 may transmit a beamformed broadcast request message 706 in each spatial direction sequentially. For example, if the UE 702 has n transmit spatial directions, the UE 702 may transmit a beamformed broadcast request message 706 sequentially in each of the n transmit spatial directions. The broadcast request message may include a Zadoff-Chu sequence with parameters that are based on the configuration information of the mmW base station 704 obtained from the eNB 714 through the LTE network.

The mmW base station 704 searches/scans for the broadcast request message 706 during the dedicated time periods in which the UE 702 is allowed to transmit broadcast request messages. The mmW base station 704 may be equipped with one of two beamforming techniques: (1) digital beamforming, and (2) analog beamforming. With digital baseband beamforming (see FIG. 9), the UE 702 transmits the broadcast request message 706 n*(m/m') times by repeatedly transmitting (m/m' times) the sequence of n beamformed broadcast request messages in each of the n different transmit spatial directions of the UE 702, where m' is the number of directions in which the mmW base station 704 can concurrently receive, and m is the total number of receive spatial directions in which the mmW base station 704 is configured to receive. In general, m may be greater than or equal to m' and m may be an integral multiple of m'. However, m and m' do not necessarily need to hold the aforementioned relationship; in such case the UE 702 may transmit the broadcast request message 706 n*ceil(m/m') times, where ceil(x) rounds up to the smallest integer greater than or equal to x. The mmW base station 704 may determine the signal received in any or all of the m' different directions by applying different weights (phase and/or amplitude changes) to the sum of the received signals in m' directions. By repeatedly (m/m' times) receiving in m' directions concurrently, the mmW base station 704 may determine a received signal for each of m different receive spatial directions of the mmW base station 704. With analog beamforming (see FIG. 8), the UE 702 transmits the broadcast request message 706 n*m times by repeatedly transmitting (m times) the sequence of n beamformed broadcast request messages in each of the n different transmit spatial directions of the UE 702. The mmW base station 704 scans for each broadcast request message 706 while adjusting its receive spatial direction. To adjust its receive spatial direction, the mmW base station 704 configures its antenna array to receive in the desired particular spatial direction.

After the mmW base station 704 receives the broadcast request message 706, the mmW base station 704 identifies 718 a preferred UE transmit spatial direction. The mmW base station 704 may determine a preferred UE transmit spatial direction based on a received energy of each of the scanned broadcast request messages. The mmW base station 704 may determine the particular UE transmit spatial direction based on a timing offset at which the broadcast request message 706 was received, as each of the n beamformed transmissions of the broadcast request message 706 has a different timing offset. The preferred UE transmit spatial direction is the spatial direction that provides the best channel with the mmW base station 704.

If the mmW base station 704 successfully receives the broadcast request message 706 from the UE 702, the mmW base station 704 sends a broadcast response message 708 to the UE 702. The information in the signal 716 may include information indicating the broadcast response time period in which the mmW base station 704 sends the broadcast response message 708. There are n time periods (also referred to as time slots) in which the mmW base station 704 can send the broadcast response message 708. If the mmW base station 704 determines that the $i^{th}$ UE transmit spatial direction is preferred, the mmW base station 704 transmits the broadcast response message 708 in the $i^{th}$ time period of the n time periods. The UE 702 scans for the broadcast response message 708 in the n different UE receive spatial directions. The UE 702 receives the broadcast response message 708 in the $i^{th}$ time period, and therefore determines 710 that the $i^{th}$ UE receive spatial direction is the preferred UE receive spatial direction. The UE 702 also determines 710 that the $i^{th}$ UE transmit spatial direction is the preferred UE transmit spatial direction, as the best UE receive spatial direction is also the best UE transmit spatial direction. The broadcast response message 708 may contain broadcast request confirmation information, and may further contain information about a further handshake process.

Figure 8:
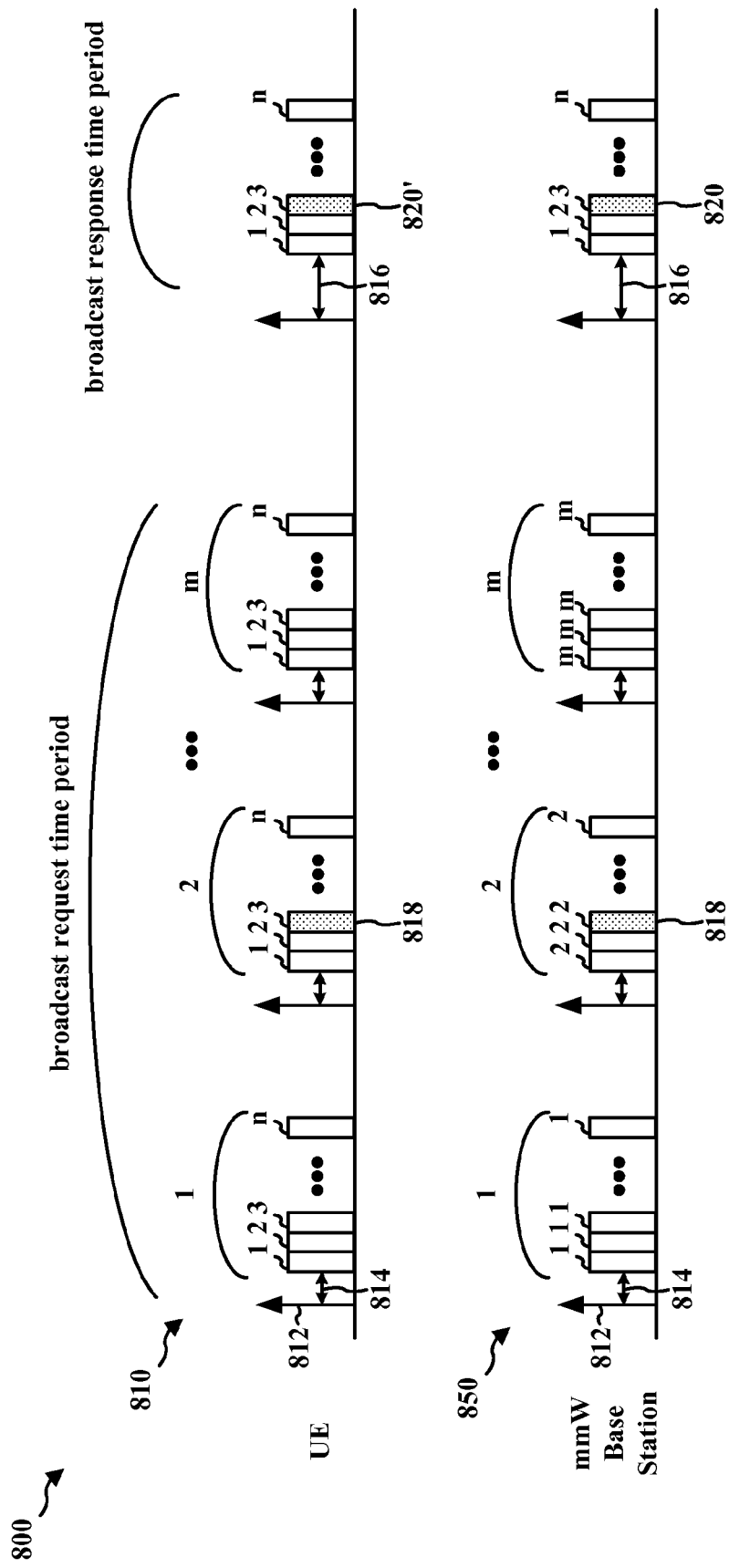
FIG. 8 is a second diagram for illustrating exemplary methods associated with UE initiated discovery in assisted millimeter wavelength wireless access networks.

FIG. 8 is a second diagram 800 for illustrating exemplary methods associated with UE initiated discovery in assisted millimeter wavelength wireless access networks. In particular, FIG. 8 illustrates the analog beamforming process. With reference to diagram 810, as discussed supra, the UE 702 determines a timing 812 of the LTE network based on timing information received from the eNB 714. The UE 702 may also receive information indicating a timing offset 814 indicating a broadcast request time period for transmitting broadcast request messages. The UE 702 may also receive information indicating a timing offset 816 indicating a broadcast response time period for receiving broadcast response messages. With analog beamforming, the UE 702 transmits the broadcast request message n*m times by repeatedly transmitting (m times) the sequence of n beamformed broadcast request messages in each of the n different transmit spatial directions of the UE 702. With reference to the diagram 850, the mmW base station 704 scans for each broadcast request message while adjusting its receive spatial direction after each sequence of n beamformed broadcast request messages. Alternatively, the UE 702 may adjust its transmit spatial direction after each sequence of n beamformed broadcast request messages, and the mmW base station 704 may adjust its receive spatial direction after each scanned beamformed broadcast request message. Other configurations are possible. That is, any combination is possible as long as the mmW base station 704 scans for n*m beamformed broadcast request messages in which each scanned broadcast request message is associated with a different combination of the UE transmit spatial direction and the mmW base station receive spatial direction.

Upon scanning for the beamformed broadcast request messages, the mmW base station 704 determines the preferred UE transmit spatial direction and the preferred mmW base station receive spatial direction. Assume that the mmW base station 704 determines that the $3^{rd}$ UE transmit spatial direction is the best UE transmit spatial direction and that the $2^{nd}$ mmW base station receive spatial direction is the best mmW base station receive spatial direction (indicated in resource 818). Accordingly, the mmW base station 704 determines that the $2^{nd}$ mmW base station transmit spatial direction is the best mmW base station transmit spatial direction (the best spatial receive and spatial transmit directions are the same). During a broadcast response period, using its $2^{nd}$ mmW base station transmit spatial direction, the mmW base station 704 transmits a beamformed broadcast response message in the $3^{rd}$ time period of the n time periods in resource 820. The resource 820 may be a resource block pair in a subframe (see FIG. 3). The UE 702 adjusts its receive spatial direction in each of the time periods, receiving the broadcast response message when scanning with its $3^{rd}$ receive spatial direction. Based on the resource 820' in which the beamformed broadcast response message is received (the resources 820 and 820' are the same resource), the UE 702 determines that the $3^{rd}$ UE transmit spatial direction is the best transmit spatial direction for transmitting signals to the mmW base station 704 and that the $3^{rd}$ UE receive spatial direction is the best receive spatial direction for receiving signals from the mmW base station 704. Accordingly, the mmW base station 704 uses its $2^{nd}$ spatial direction for transmitting beamformed signals to and receiving beamformed signals from the UE 702, and the UE 702 uses its $3^{rd}$ spatial direction for transmitting beamformed signals to and receiving beamformed signals from the mmW base station 704.

Figure 9:
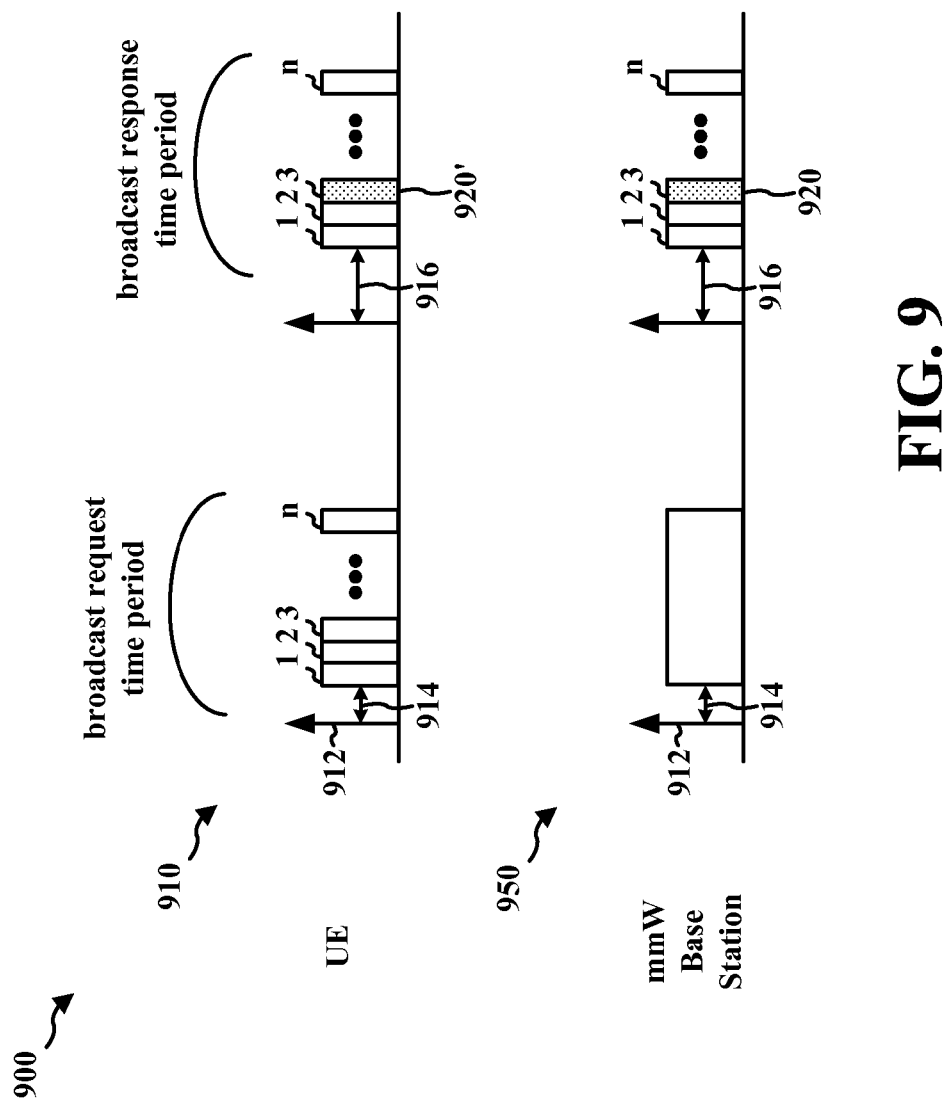
FIG. 9 is a third diagram for illustrating exemplary methods associated with UE initiated discovery in assisted millimeter wavelength wireless access networks.

FIG. 9 is a third diagram 900 for illustrating exemplary methods associated with UE initiated discovery in assisted millimeter wavelength wireless access networks. In particular, FIG. 9 illustrates the process when the mmW base station is equipped with digital beamforming and can receive in m'=m spatial directions concurrently. With reference to diagram 910, as discussed supra, the UE 702 determines a timing 912 of the LTE network based on timing information received from the eNB 714. The UE 702 may also receive information indicating a timing offset 914 indicating a broadcast request time period for transmitting broadcast request messages. The UE 702 may also receive information indicating a timing offset 916 indicating a broadcast response time period for receiving broadcast response messages. With digital beamforming, the UE 702 transmits the broadcast request message n times, once in each of n different transmit spatial directions, and the mmW base station 704 scans for each broadcast request message in m=m' receive directions concurrently n times. For each receive time period corresponding to one of the n different transmit spatial directions, the mmW base station 704 applies different weights (phase and/or amplitude changes) to the received signal to determine a received signal for each of m=m' different receive spatial directions of the mmW base station 704. If m is greater than m' and is an integral multiple of m', the UE 702 transmits the broadcast request n*(m/m') times, (m/m') times in each of n different transmit spatial directions, and the mmW base station 704 scans for broadcast request messages in blocks of n, and within each block, the mmW base station 704 scans in m' spatial directions concurrently. There will be (m/m') such blocks and at the end of the beam scan, the mmW base station 704 will have a scan result for each of the n*m possible UE 702-mmW base station 704 transmit and receive spatial direction combination.

Upon scanning for and processing the beamformed broadcast request messages, the mmW base station 704 determines the preferred UE transmit spatial direction and the preferred mmW base station receive spatial direction. Assume that the mmW base station 704 determines that the $3^{rd}$ UE transmit spatial direction is the best UE transmit spatial direction and that the $2^{nd}$ mmW base station receive spatial direction is the best mmW base station receive spatial direction. Accordingly, the mmW base station 704 determines that the $2^{nd}$ mmW base station transmit spatial direction is the best mmW base station transmit spatial direction (the best spatial receive and spatial transmit directions are the same). During a broadcast response period, using its $2^{nd}$ mmW base station transmit spatial direction, the mmW base station 704 transmits a beamformed broadcast response message in the $3^{rd}$ time period of the n time periods in resource 920. The resource 920 may be a resource block pair in a subframe (see FIG. 3). The UE 702 adjusts its receive spatial direction in each of the time periods, receiving the broadcast response message when scanning with its $3^{rd}$ receive spatial direction. Based on the resource 920' in which the beamformed broadcast response message is received (the resources 920 and 920' are the same resource), the UE 702 determines that the $3^{rd}$ UE transmit spatial direction is the best transmit spatial direction for transmitting signals to the mmW base station 704 and that the $3^{rd}$ UE receive spatial direction is the best receive spatial direction for receiving signals from the mmW base station 704. Accordingly, the mmW base station 704 uses its $2^{nd}$ spatial direction for transmitting beamformed signals to and receiving beamformed signals from the UE 702, and the UE 702 uses its $3^{rd}$ spatial direction for transmitting beamformed signals to and receiving beamformed signals from the mmW base station 704.

Figure 10:
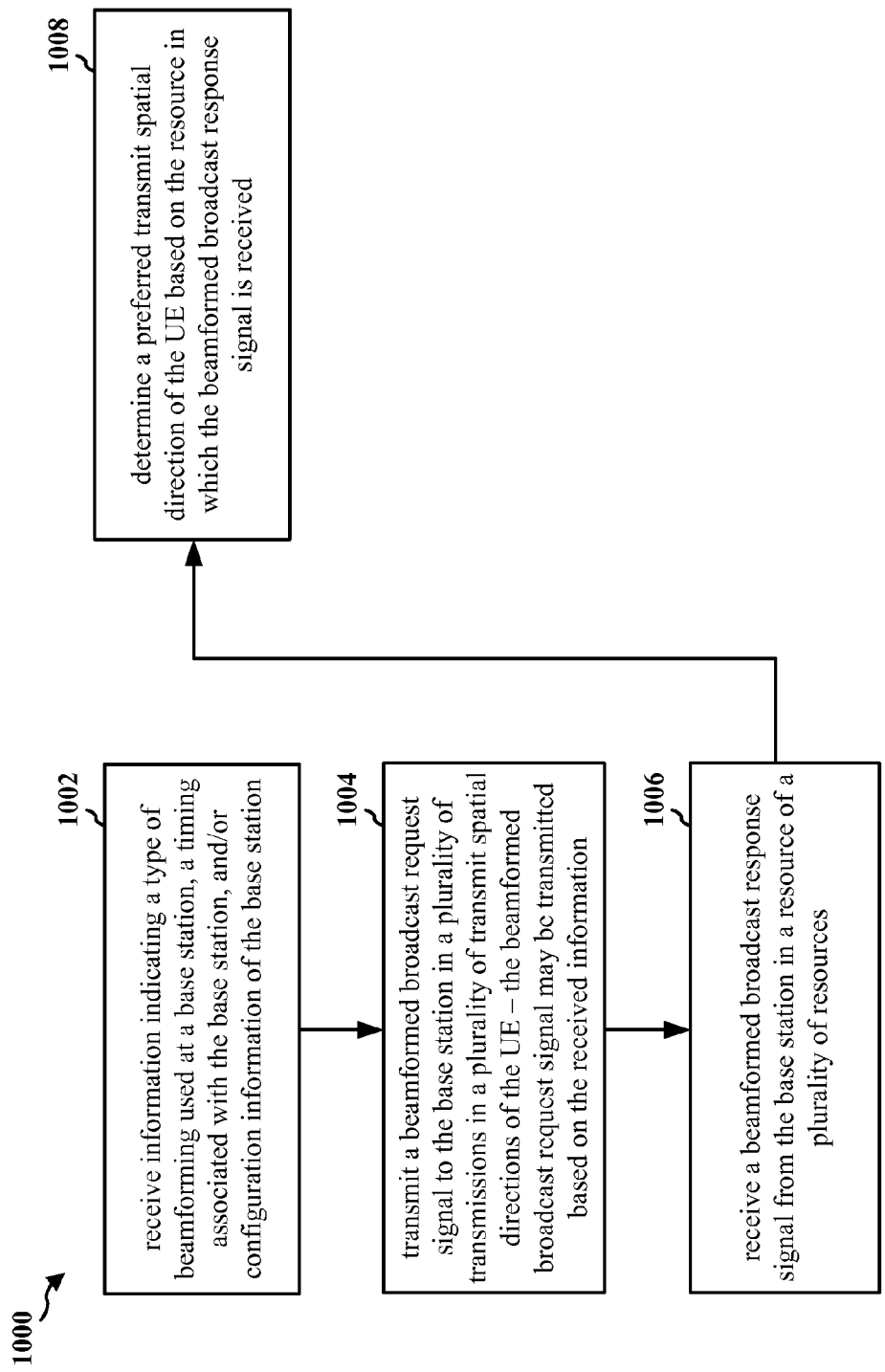
FIG. 10 is a flow chart of a first method of wireless communication.

FIG. 10 is a flow chart 1000 of a first method of wireless communication. The method may be performed by a UE, such as the UE 702. At step 1002, the UE receives information indicating a type of beamforming used at a base station, a timing associated with the base station, and/or configuration information of the base station. At step 1002, the received information may apply to a first network to which the base station belongs, and may be received through a second network different than the first network. The first network may have a higher carrier frequency than the second network. For example, the first network may be an mmW network, and the second network may be an LTE network. In one example, the first network operates at mmW frequencies or near mmW frequencies, and the LTE network operates at less than 3 GHz. At step 1004, based on the receive information at step 1002, the UE transmits a beamformed broadcast request signal to the base station in a plurality of transmissions in a plurality of transmit spatial directions of the UE. At step 1006, the UE receives a beamformed broadcast response signal from the base station in a resource of a plurality of resources. At step 1008, the UE determines a preferred transmit spatial direction of the UE based on the resource in which the beamformed broadcast response signal is received.

For example, referring to FIGS. 7, 8, and 9, the UE 702 receives information indicating a type of beamforming used at the base station 704, a timing associated with the base station 704, and/or configuration information of the base station 704 within the signal 716 from the eNB 714, which operates in the LTE network. The UE 702 transmits a beamformed broadcast request signal 706 to the base station 704 in a plurality of transmissions in a plurality of n transmit spatial directions of the UE 702 (see FIGS. 8, 9). The UE 702 receives a beamformed broadcast response signal 708 from the base station 704 in a resource 820', 920' of a plurality of resources. The UE 702 determines 710 a preferred transmit spatial direction of the UE 702 based on the resource 820', 920' in which the beamformed broadcast response signal is received.

At step 1004, the transmitted beamformed broadcast request signal may include a sequence that is based on configuration information received at step 1002. In particular, the beamformed broadcast request signal may include a Zadoff-Chu sequence, which may be a function of a unique identifier of the mmW base station 704. At step 1004, the plurality of transmissions may include N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, and m' being the number of scan spatial directions the base station can scan concurrently. In one example, the first type of beamforming is an analog beamforming and the second type of beamforming is a digital beamforming. As discussed supra, in the first type of beamforming, the beamformed broadcast request signal is transmitted m times in each of n different transmit spatial directions of the UE, and in the second type of beamforming, the beamformed broadcast request signal is transmitted (m/m') times in each of n different transmit spatial directions of the UE.

Figure 11:
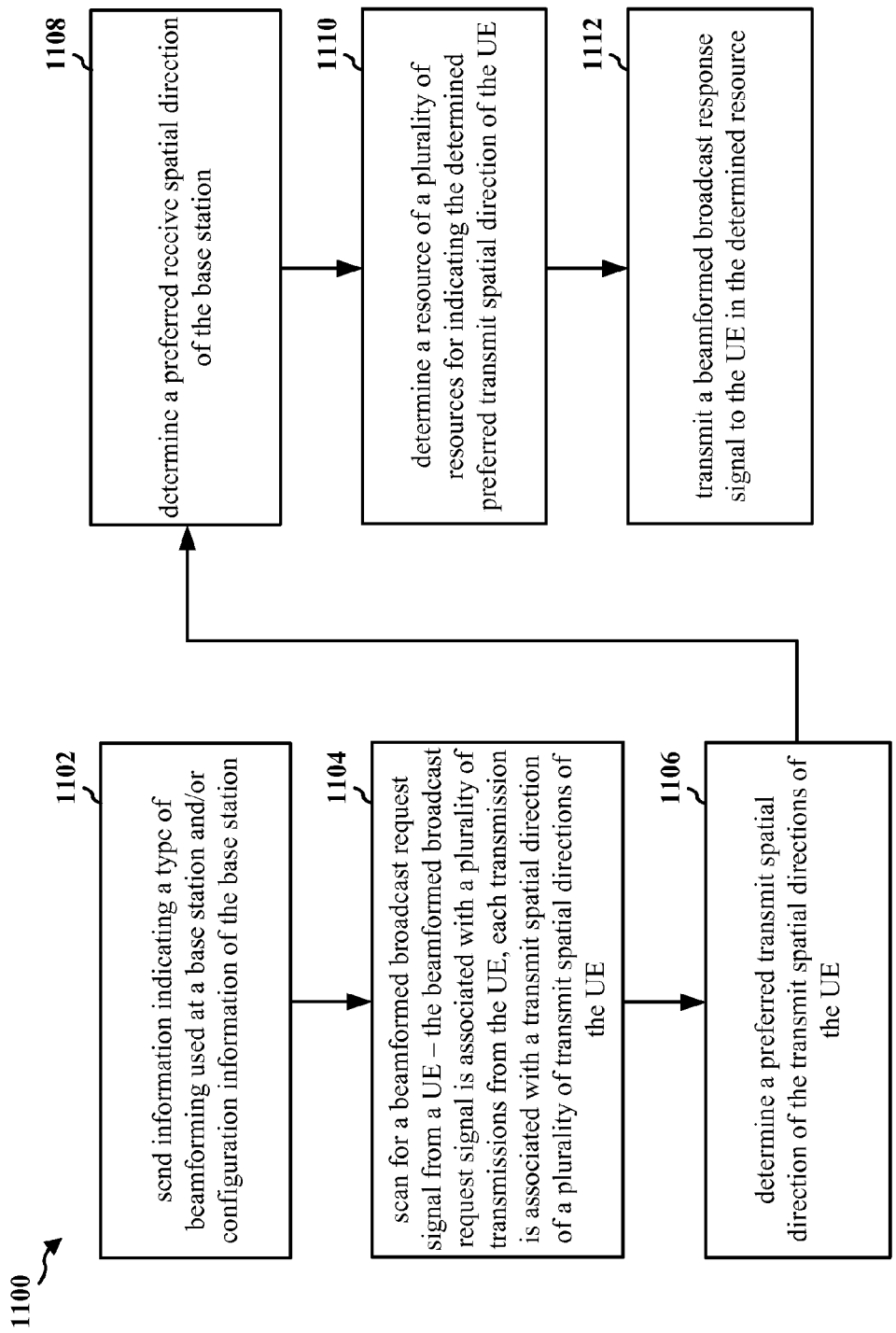
FIG. 11 is a flow chart of a second method of wireless communication.

FIG. 11 is a flow chart 1100 of a second method of wireless communication. The method may be performed by a base station, such as the base station 704. At step 1102, the base station sends information indicating a type of beamforming used at the base station and/or configuration information of the base station. For example, referring to FIG. 7, the mmW base station 704 sends 712 a beamforming type, the number of spatial directions in which the base station 704 can receive, and configuration information to the eNB 714. The eNB 714 transmits the received information along with timing information to the UE 702. At step 1104, based on the sent information at step 1102, the base station scans for a beamformed broadcast request signal from a UE. The beamformed broadcast request signal is associated with a plurality of transmissions from the UE. Each transmission is associated with a transmit spatial direction of a plurality of transmit spatial directions of the UE. At step 1106, the base station determines a preferred transmit spatial direction of the the UE. At step 1108, the base station determines a preferred receive spatial direction of the base station. At step 1110, the base station determines a resource of a plurality of resources for indicating the determined preferred transmit spatial direction of the UE. At step 1112, the base station transmits (using a transmit spatial direction of the base station corresponding to the preferred receive spatial direction of the base station from step 1108) a beamformed broadcast response signal to the UE in the determined resource.

For example, referring to FIGS. 7, 8, and 9, the base station 704 scans for a beamformed broadcast request signal 706 from the UE 702. The beamformed broadcast request signal 706 is associated with a plurality of transmissions from the UE 702. Each transmission is associated with a transmit spatial direction of a plurality of n transmit spatial directions of the UE 702. The base station 704 determines 718 a preferred transmit spatial direction (e.g., the $3^{rd}$ transmit spatial direction) of the transmit spatial directions of the UE 702. The base station 704 determines a preferred receive spatial direction (e.g., the $2^{nd}$ receive spatial direction) of the base station 704. The base station 704 determines a resource 820, 920 of a plurality of resources for indicating the determined preferred transmit spatial direction. The base station 704 transmits a beamformed broadcast response signal to the UE 702 in the determined resource 820, 920.

At step 1104, the beamformed broadcast request signal is scanned through a first network and, at step 1102, the information is sent through a second network. The first network has a higher carrier frequency than the second network. In one example, the first network is an mmW network and the second network is an LTE network. As discussed supra, the beamformed broadcast request signal may include a sequence that is based on the indicated configuration information from step 1102. In particular, the sequence may be a Zadoff-Chu sequence. The plurality of transmissions may include N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, m' being the number of spatial directions in which the base station can receive concurrently. The first type of beamforming may be an analog beamforming and the second type of beamforming may be a digital beamforming. In the first type of beamforming, the beamformed broadcast request signal may be scanned n times in each of m different scan spatial directions of the base station, and in the second type of beamforming, the beamformed broadcast request signal may be scanned in m' directions concurrently n times. For digital beamforming, the base station may process the beamformed broadcast request signal based on at least one scan spatial direction of the base station of m different possible scan spatial directions of the base station when the second type of beamforming used. To process the beamformed broadcast request signal, the base station may apply different weights (amplitude and/or phase) to the beamformed broadcast request signal to determine a broadcast request signal for each of a subset of the m different possible scan spatial directions (e.g., all m different possible scan directions). The base station determines the preferred transmit spatial direction of the UE based on the processing. Subsequently, the base station determines a preferred receive spatial direction of the base station based on the processing when the second type of beamforming is used. For analog beamforming, the base station may determine a preferred receive spatial direction of the base station when the first type of beamforming is used. The preferred receive spatial direction of the base station is one of the m different scan spatial directions of the base station. The preferred transmit spatial direction of the UE is one of the n different transmit spatial directions of the UE.

Figure 12:
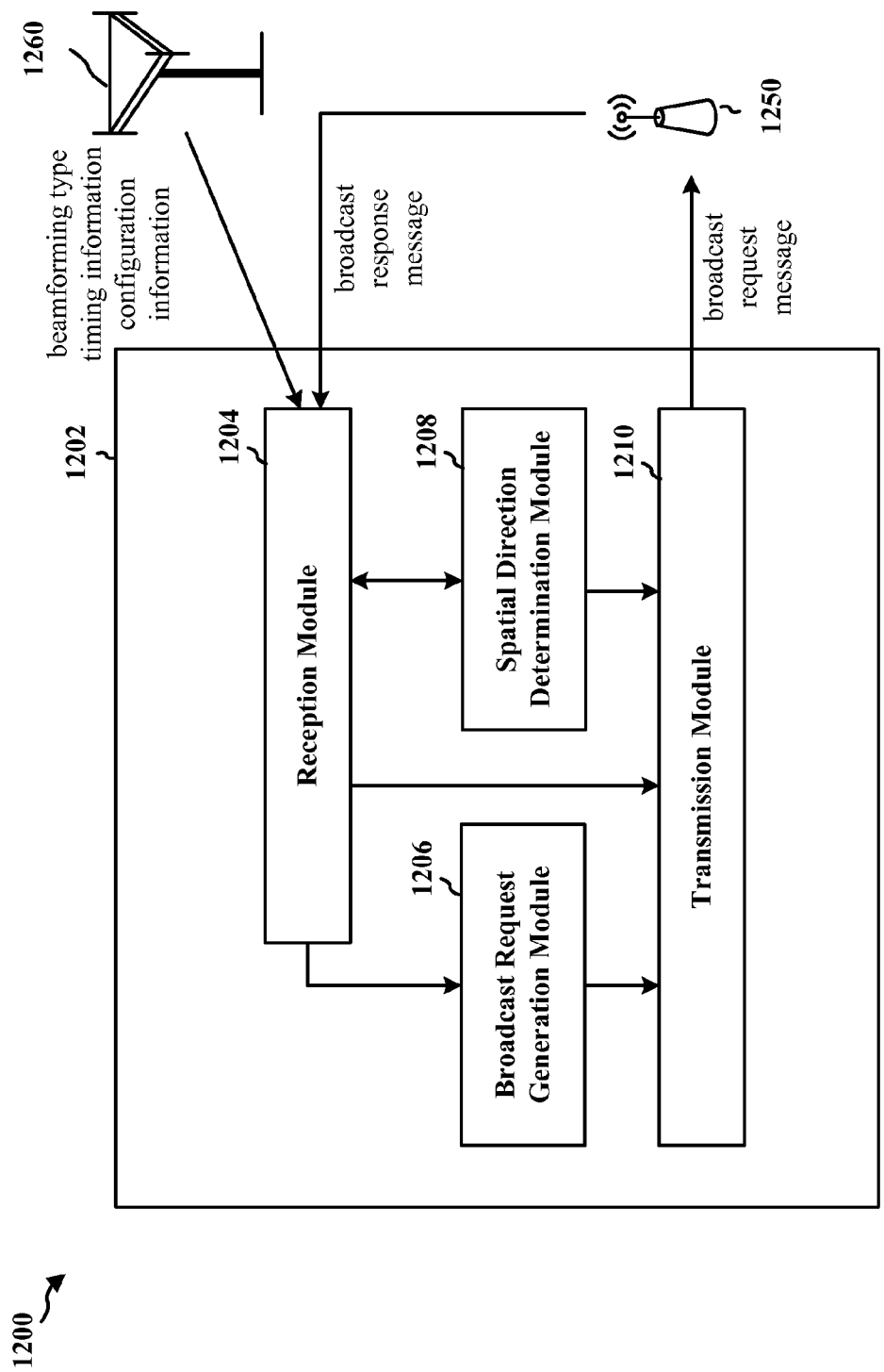
FIG. 12 is a data flow diagram illustrating the data flow between different modules/means/components in a first exemplary apparatus.

FIG. 12 is a data flow diagram 1200 illustrating the data flow between different modules/means/components in a first exemplary apparatus 1202. The apparatus may be UE, such as the UE 702. The apparatus includes a broadcast request generation module 1206 that is configured to generate a broadcast request message. The apparatus further includes a transmission module 1210 that is configured to transmit a beamformed broadcast request signal including the broadcast request message to a base station 1250 in a plurality of transmissions in a plurality of transmit spatial directions of the UE. The apparatus further includes a reception module 1204 that is configured to receive a beamformed broadcast response signal from the base station 1250 in a resource of a plurality of resources. The apparatus further includes a spatial direction determination module 1208 that is configured to determine a preferred transmit spatial direction of the UE based on the resource in which the beamformed broadcast response signal is received.

The reception module 1204 may be configured to receive information indicating a type of beamforming used at the base station 1250. The reception module 1204 may receive such information through a second network (e.g., an LTE network via the eNB 1260). The beamformed broadcast request signal may be transmitted through a first network. The first network may have a higher carrier frequency than the second network. The information received through the second network may further indicate a timing associated with the first network. The received information may further indicate configuration information of the base station 1250. The beamformed broadcast request signal may include a sequence that is based on the indicated configuration information. The sequence may be a Zadoff-Chu sequence. The plurality of transmissions may include N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, m' being the number of spatial directions in which the base station can receive concurrently. The first type of beamforming may be an analog beamforming and the second type of beamforming may be a digital beamforming. In the first type of beamforming, the beamformed broadcast request signal may be transmitted m times in each of n different transmit spatial directions of the UE, and in the second type of beamforming, the beamformed broadcast request signal may be transmitted (m/m') times in each of n different transmit spatial directions of the UE.

The apparatus may include additional modules that perform each of the steps of the algorithm in the aforementioned flow charts of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
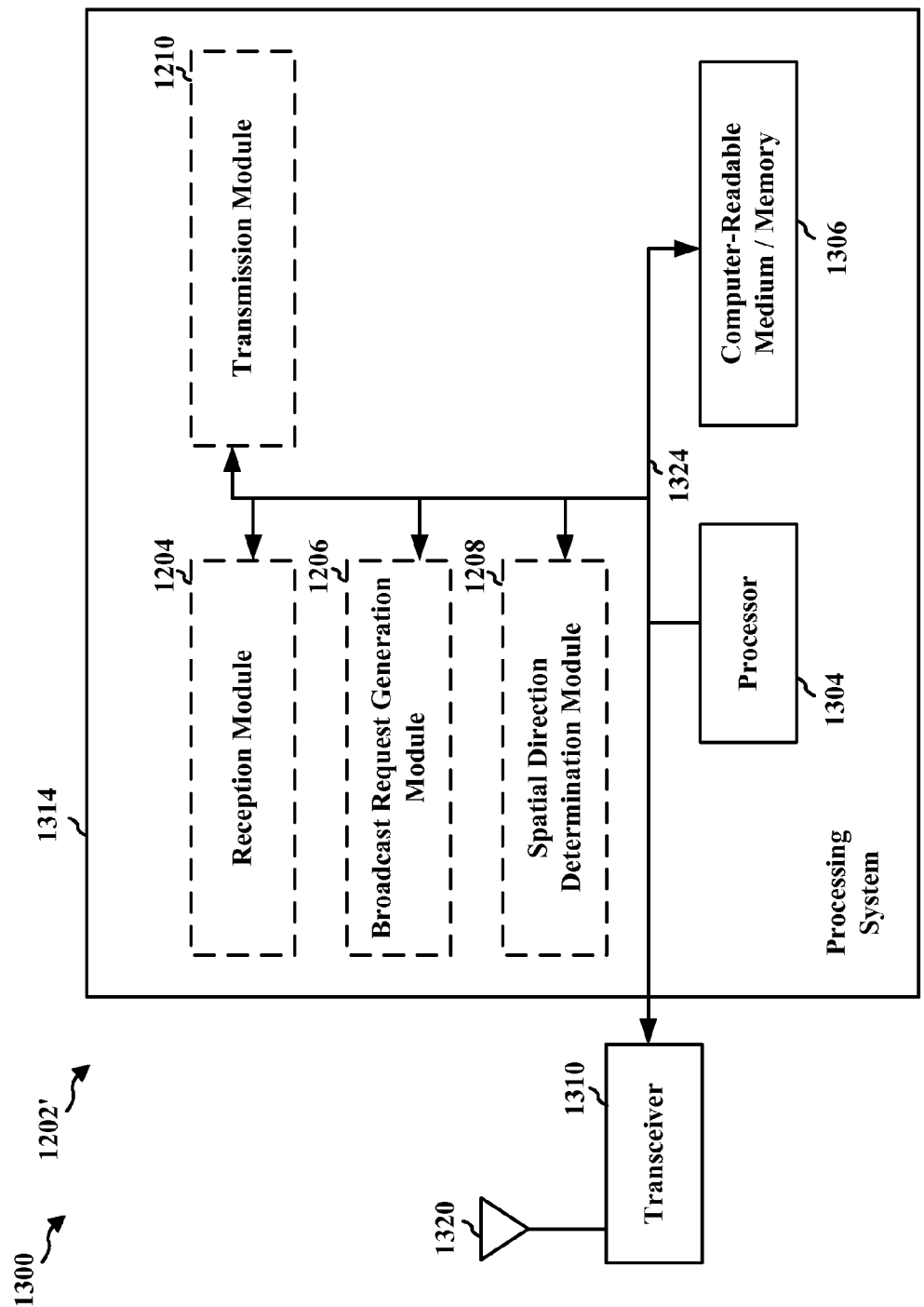
FIG. 13 is a diagram illustrating an example of a hardware implementation for a first apparatus employing a processing system.

FIG. 13 is a diagram 1300 illustrating an example of a hardware implementation for a first apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium/memory 1306, one or more hardware modules coupled to the processor 1304, or some combination thereof. The processing system 1314 may be a component of the UE 650/702 and may include the memory 660 and/or at least one of the TX processor 668, the RX processor 656, and the controller/processor 659.

In one configuration, the apparatus 1202/1202' for wireless communication includes means for transmitting a beamformed broadcast request signal to a base station in a plurality of transmissions in a plurality of transmit spatial directions of the UE, means for receiving a beamformed broadcast response signal from the base station in a resource of a plurality of resources, and means for determining a preferred transmit spatial direction of the UE based on the resource in which the beamformed broadcast response signal is received. The apparatus may further include means for receiving information indicating a type of beamforming used at the base station. The beamformed broadcast request signal may be transmitted based on the received information. The beamformed broadcast request signal may be transmitted through a first network and the information may be received through a second network. The first network may have a higher carrier frequency than the second network. The information received through the second network may further indicate a timing associated with the first network. The beamformed broadcast request signal may be transmitted through the first network based on the indicated timing. The received information may further indicate configuration information of the base station, and the beamformed broadcast request signal may include a sequence that is based on the indicated configuration information. The sequence may be a Zadoff-Chu sequence. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
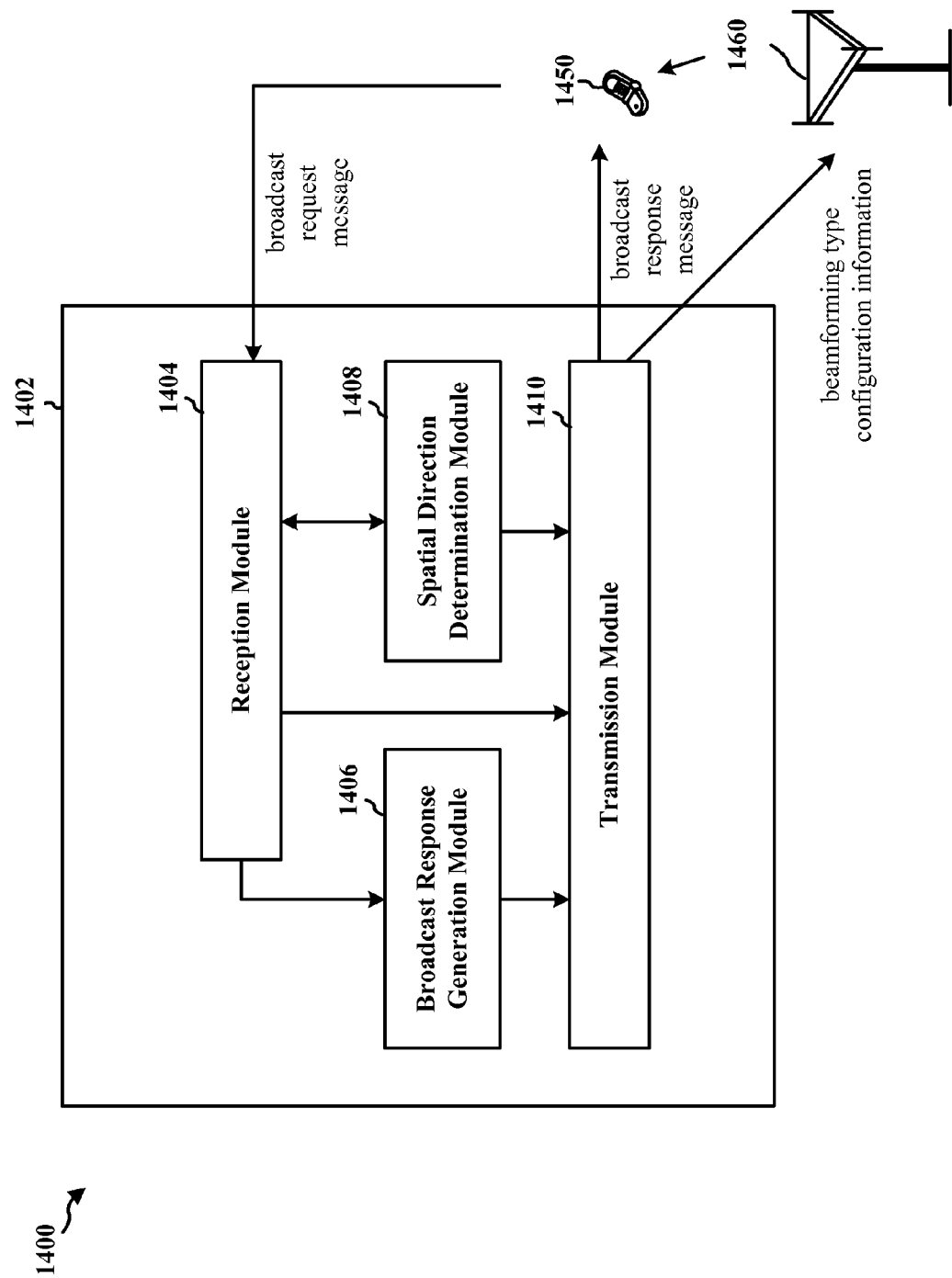
FIG. 14 is a data flow diagram illustrating the data flow between different modules/means/components in a second exemplary apparatus.

FIG. 14 is a data flow diagram 1400 illustrating the data flow between different modules/means/components in a second exemplary apparatus 1402. The apparatus may be a base station, such as the mmW base station 704. The apparatus includes a reception module 1404 that is configured to scan for a beamformed broadcast request signal from a UE 1450. The beamformed broadcast request signal is associated with a plurality of transmissions from the UE 1450. Each transmission is associated with a transmit spatial direction of a plurality of transmit spatial directions of the UE 1450. The apparatus further includes a spatial direction determination module 1408 that is configured to determine a preferred transmit spatial direction of the transmit spatial directions of the UE 1450. The apparatus further includes a transmission module 1410 that is configured to determine a resource of a plurality of resources for indicating the determined preferred transmit spatial direction, and to transmit a beamformed broadcast response signal to the UE 1450 in the determined resource. The beamformed broadcast response signal may be generated by a broadcast response generation module 1406. The transmission module 1410 may be configured to send information indicating a type of beamforming used at the base station. The transmission module 1410 may send the information to through a second network to the eNB 1460. The beamformed broadcast request signal may be scanned through a first network. The first network may have a higher carrier frequency than the second network. The information sent through the second network via eNB 1460 may further indicate a timing associated with the first network (within the configuration information). The sent information may further indicate configuration information of the base station. The beamformed broadcast request signal may include a sequence that is based on the indicated configuration information. In particular, the sequence may be a Zadoff-Chu sequence. The plurality of transmissions may include N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, m' being the number of spatial directions in which the base station can receive concurrently. The first type of beamforming may be an analog beamforming and the second type of beamforming may be a digital beamforming. In the first type of beamforming, the beamformed broadcast request signal may be scanned n times in each of m different scan spatial directions of the base station, and in the second type of beamforming, the beamformed broadcast request signal may be scanned n*(m/m') times. The spatial direction determination module 1408 may be configured to process the beamformed broadcast request signal based on at least one scan spatial direction of the base station of m different possible scan spatial directions of the base station when the second type of beamforming used, and to determine the preferred transmit spatial direction of the UE based on the processing. The spatial direction determination module 1408 may be configured to determine a preferred receive spatial direction of the base station based on the processing when the second type of beamforming is used. The spatial direction determination module 1408 may be configured to determine a preferred receive spatial direction of the base station when the first type of beamforming is used, the preferred receive spatial direction of the base station being one of the m different scan spatial directions of the base station, the preferred transmit spatial direction of the UE being one of the n different transmit spatial directions of the UE.

The apparatus may include additional modules that perform each of the steps of the algorithm in the aforementioned flow chart of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
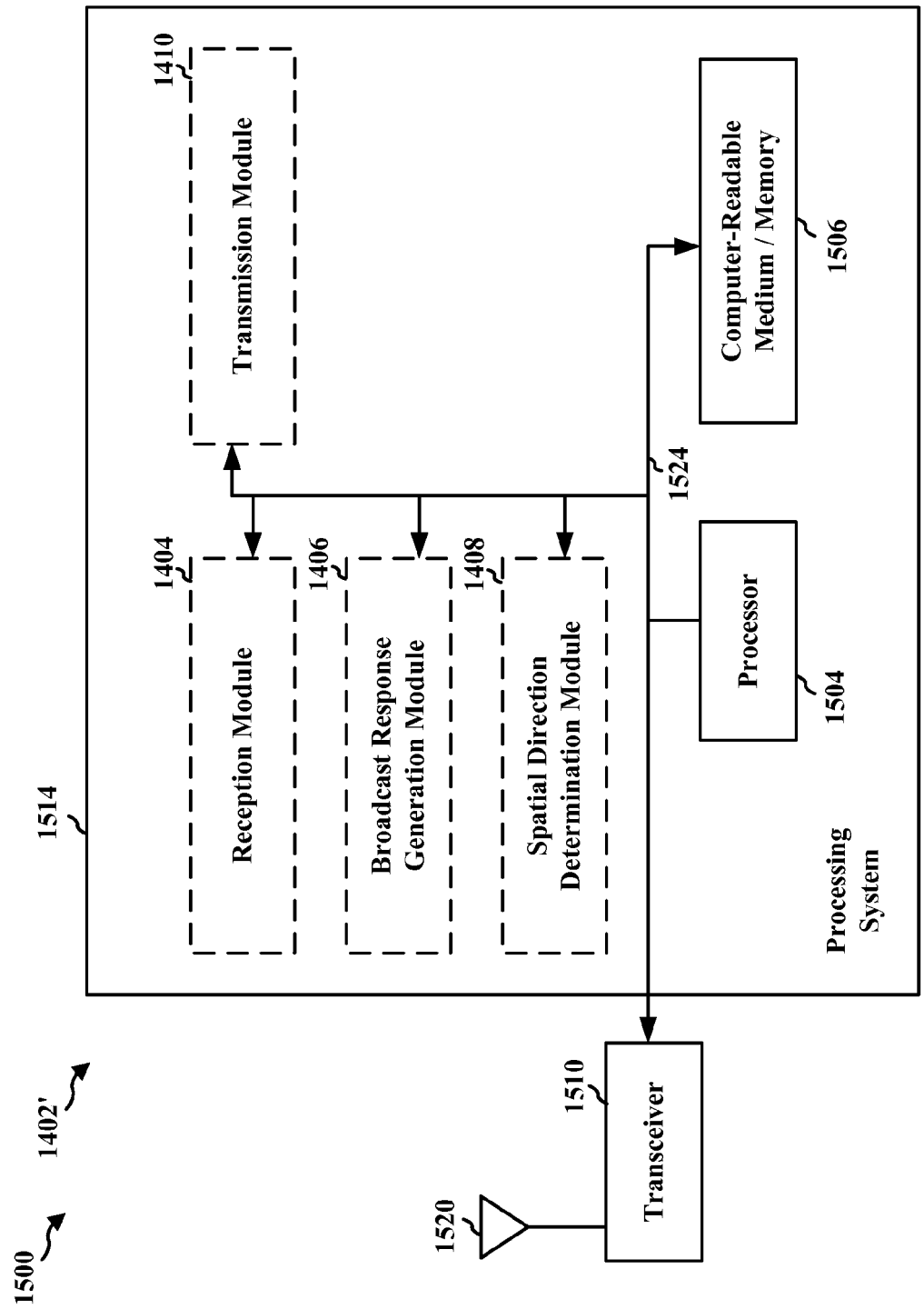
FIG. 15 is a diagram illustrating an example of a hardware implementation for a second apparatus employing a processing system.

FIG. 15 is a diagram 1500 illustrating an example of a hardware implementation for a second apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, and 1410 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514. In addition, the transceiver 1510 receives information from the processing system 1514, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, and 1410. The modules may be software modules running in the processor 1504, resident/stored in the computer readable medium/memory 1506, one or more hardware modules coupled to the processor 1504, or some combination thereof. The processing system 1514 may be a component of the mmW base station 704.

In one configuration, the apparatus 1402/1402' for wireless communication includes means for scanning for a beamformed broadcast request signal from a UE. The beamformed broadcast request signal is associated with a plurality of transmissions from the UE. Each transmission is associated with a transmit spatial direction of a plurality of transmit spatial directions of the UE. The apparatus further includes means for determining a preferred transmit spatial direction of the transmit spatial directions of the UE, means for determining a resource of a plurality of resources for indicating the determined preferred transmit spatial direction, and means for transmitting a beamformed broadcast response signal to the UE in the determined resource. The apparatus may further include means for sending information indicating a type of beamforming used at the base station. The beamformed broadcast request signal may be scanned based on the sent information. The beamformed broadcast request signal may be scanned through a first network and the information may be sent through a second network. The first network may have a higher carrier frequency than the second network. The information sent through the second network may further indicate a timing associated with the first network. The beamformed broadcast request signal may be scanned through the first network based on the indicated timing. The sent information may further indicate configuration information of the base station, and the beamformed broadcast request signal may include a sequence that is based on the indicated configuration information. The plurality of transmissions may include N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, m' being the number of spatial directions in which the base station can receive concurrently. The first type of beamforming may be an analog beamforming and the second type of beamforming may be a digital beamforming. In the first type of beamforming, the beamformed broadcast request signal may be scanned n times in each of m different scan spatial directions of the base station, and in the second type of beamforming, the beamformed broadcast request signal may be scanned n*(m/m') times. The apparatus may further include means for processing the beamformed broadcast request signal based on at least one scan spatial direction of the base station of m different possible scan spatial directions of the base station when the second type of beamforming used. The preferred transmit spatial direction of the UE may be determined based on the processing. The apparatus may further include means for determining a preferred receive spatial direction of the base station when the first type of beamforming is used. The preferred receive spatial direction of the base station may be one of the m different scan spatial directions of the base station. The preferred transmit spatial direction of the UE may be one of the n different transmit spatial directions of the UE. The aforementioned means may be one or more of the aforementioned modules of the apparatus 1402 and/or the processing system 1514 of the apparatus 1402' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    transmitting, through a first network, a beamformed broadcast request signal to a base station in a plurality of transmissions in a plurality of transmit spatial directions of the UE based on information received through a second network;
    receiving a beamformed broadcast response signal from the base station in a resource of a plurality of resources; and
    determining a preferred transmit spatial direction of the UE based on the resource in which the beamformed broadcast response signal is received.

2. The method of claim 1, further comprising receiving the information indicating a type of beamforming used at the base station.

3. The method of claim 1, wherein the first network has a higher carrier frequency than the second network.

4. The method of claim 3, wherein the information received through the second network further indicates a timing associated with the first network, wherein the beamformed broadcast request signal is transmitted through the first network based on the indicated timing.

5. The method of claim 2, wherein the information received through the second network further indicates configuration information of the base station, and the beamformed broadcast request signal includes a sequence that is based on the indicated configuration information.

6. The method of claim 5, wherein the sequence is a Zadoff-Chu sequence.

7. The method of claim 2, wherein the plurality of transmissions comprises N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, and m' being a number of spatial directions in which the base station can scan concurrently.

8. The method of claim 7, wherein the first type of beamforming is an analog beamforming and the second type of beamforming is a digital beamforming.

9. The method of claim 7, wherein in the first type of beamforming, the beamformed broadcast request signal is transmitted m times in each of n different transmit spatial directions of the UE, and in the second type of beamforming, the beamformed broadcast request signal is transmitted (m/m') times in each of n different transmit spatial directions of the UE.

10. A method of wireless communication of a base station, comprising:
   scanning, through a first network, for a beamformed broadcast request signal from a user equipment (UE), the beamformed broadcast request signal being based on information sent through a second network and associated with a plurality of transmissions from the UE, each transmission being associated with a transmit spatial direction of a plurality of transmit spatial directions of the UE;
   determining a preferred transmit spatial direction of the transmit spatial directions of the UE;
   determining a resource of a plurality of resources based on the determined preferred transmit spatial direction; and
   transmitting a beamformed broadcast response signal to the UE in the determined resource.

11. The method of claim 10, further comprising sending the information indicating a type of beamforming used at the base station, wherein the beamformed broadcast request signal is scanned based on the sent information.

12. The method of claim 11, wherein the first network has a higher carrier frequency than the second network.

13. The method of claim 12, wherein the information sent through the second network further indicates a timing associated with the first network, wherein the beamformed broadcast request signal is scanned through the first network based on the indicated timing.

14. The method of claim 11, wherein the sent information further indicates configuration information of the base station, and the beamformed broadcast request signal includes a sequence that is based on the indicated configuration information.

15. The method of claim 14, wherein the sequence is a Zadoff-Chu sequence.

16. The method of claim 11, wherein the plurality of transmissions comprises N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, and m' being the number of spatial directions in which the base station can receive concurrently.

17. The method of claim 16, wherein the first type of beamforming is an analog beamforming and the second type of beamforming is a digital beamforming.

18. The method of claim 16, wherein in the first type of beamforming, the beamformed broadcast request signal is scanned n times in each of m different scan spatial directions of the base station, and in the second type of beamforming, the beamformed broadcast request signal is scanned n*(m/m') times.

19. The method of claim 18, further comprising processing the beamformed broadcast request signal based on at least one scan spatial direction of the base station of m different possible scan spatial directions of the base station when the second type of beamforming used, wherein the preferred transmit spatial direction of the UE is determined based on the processing.

20. The method of claim 19, further comprising determining a preferred receive spatial direction of the base station based on the processing when the second type of beamforming is used.

21. The method of claim 18, further comprising determining a preferred receive spatial direction of the base station when the first type of beamforming is used, the preferred receive spatial direction of the base station being one of the m different scan spatial directions of the base station, the preferred transmit spatial direction of the UE being one of the n different transmit spatial directions of the UE.

22. An apparatus for wireless communication, the apparatus being a user equipment (UE), comprising:
   means for transmitting, through a first network, a beamformed broadcast request signal to a base station in a plurality of transmissions in a plurality of transmit spatial directions of the UE based on information received through a second network;
   means for receiving a beamformed broadcast response signal from the base station in a resource of a plurality of resources; and
   means for determining a preferred transmit spatial direction of the UE based on the resource in which the beamformed broadcast response signal is received.

23. The apparatus of claim 22, further comprising means for receiving the information, the information indicating a type of beamforming used at the base station.

24. The apparatus of claim 23, wherein the first network has a higher carrier frequency than the second network.

25. The apparatus of claim 24, wherein the information received through the second network further indicates a timing associated with the first network, wherein the beamformed broadcast request signal is transmitted through the first network based on the indicated timing.

26. The apparatus of claim 23, wherein the information received through the second network further indicates configuration information of the base station, and the beamformed broadcast request signal includes a sequence that is based on the indicated configuration information.

27. The apparatus of claim 26, wherein the sequence is a Zadoff-Chu sequence.

28. The apparatus of claim 23, wherein the plurality of transmissions comprises N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, and m' being the number of spatial directions in which the base station can scan concurrently.

29. The apparatus of claim 28, wherein the first type of beamforming is an analog beamforming and the second type of beamforming is a digital beamforming.

30. The apparatus of claim 28, wherein in the first type of beamforming, the beamformed broadcast request signal is transmitted m times in each of n different transmit spatial directions of the UE, and in the second type of beamforming, the beamformed broadcast request signal is transmitted (m/m') in each of n different transmit spatial directions of the UE.

31. An apparatus for wireless communication, the apparatus being a base station, comprising:
   means for scanning, through a first network, for a beamformed broadcast request signal from a user equipment (UE), the beamformed broadcast request signal being based on information sent through a second network and associated with a plurality of transmissions from the UE, each transmission being associated with a transmit spatial direction of a plurality of transmit spatial directions of the UE;

means for determining a preferred transmit spatial direction of the transmit spatial directions of the UE;

means for determining a resource of a plurality of resources based on the determined preferred transmit spatial direction; and means for transmitting a beamformed broadcast response signal to the UE in the determined resource.

32. The apparatus of claim 31, further comprising means for sending the information indicating a type of beamforming used at the base station, wherein the beamformed broadcast request signal is scanned based on the sent information.

33. The apparatus of claim 32, wherein the first network has a higher carrier frequency than the second network.

34. The apparatus of claim 33, wherein the information sent through the second network further indicates a timing associated with the first network, wherein the beamformed broadcast request signal is scanned through the first network based on the indicated timing.

35. The apparatus of claim 32, wherein the sent information further indicates configuration information of the base station, and the beamformed broadcast request signal includes a sequence that is based on the indicated configuration information.

36. The apparatus of claim 32, wherein the plurality of transmissions comprises N transmissions, where N is equal to n*m when the information indicates a first type of beamforming is used and is equal to n*(m/m') when the information indicates a second type of beamforming is used, n being a number of transmit spatial directions of the UE, m being a number of scan spatial directions of the base station, and m' being the number of spatial directions in which the base station can scan concurrently.

37. The apparatus of claim 36, wherein the first type of beamforming is an analog beamforming and the second type of beamforming is a digital beamforming.

38. The apparatus of claim 36, wherein in the first type of beamforming, the beamformed broadcast request signal is scanned n times in each of m different scan spatial directions of the base station, and in the second type of beamforming, the beamformed broadcast request signal is scanned n*(m/m') times.

39. The apparatus of claim 38, further comprising means for processing the beamformed broadcast request signal based on at least one scan spatial direction of the base station of m different possible scan spatial directions of the base station when the second type of beamforming used, Wherein the preferred transmit spatial direction of the UE is determined based on the processing.

40. The apparatus of claim 38, further comprising means for determining a preferred receive spatial direction of the base station when the first type of beamforming is used, the preferred receive spatial direction of the base station being one of the m different scan spatial directions of the base station, the preferred transmit spatial direction of the UE being one of the n different transmit spatial directions of the UE.

* * * * *